United States Patent [19]

Read

[11] Patent Number: 5,194,696
[45] Date of Patent: Mar. 16, 1993

[54] GASKET FOR SEALING A FLAT CABLE

[75] Inventor: John D. Read, Monument, Colo.

[73] Assignee: Digital Equipment Corporation, Maynard, Mass.

[21] Appl. No.: 766,941

[22] Filed: Sep. 27, 1991

[51] Int. Cl.$^5$ .......................... H02G 3/02; H02G 3/08
[52] U.S. Cl. .................................. 174/65 R; 248/56; 277/207 R
[58] Field of Search ................ 174/65 R, 151, 117 F; 248/56; 277/180, 207 R

[56] References Cited

U.S. PATENT DOCUMENTS

| | | |
|---|---|---|
| 4,537,458 | 8/1985 | Worth . |
| 4,636,581 | 1/1987 | Roche et al. . |
| 4,859,812 | 8/1989 | Klosin et al. . |
| 4,924,038 | 5/1990 | Klosin et al. . |

*Primary Examiner*—Harold Broome
*Attorney, Agent, or Firm*—Dirk Brinkman; Barry N. Young; Ronald E. Myrick

[57] ABSTRACT

An gasket is disclosed for environmentally sealing an enclosure of a disk storage device. The gasket, which is disposed between a base and cover portion of the enclosure is designed to accommodate a flat flexible wiring cable (flexcircuit) protruding therethrough.

The gasket includes a compressible seal portion attached to the inner edge of a rigid plastic frame. The thickness of the seal is made slightly greater than the thickness of the frame. The width of the seal is substantially smaller than the width of the frame. A relief is formed on one surface of the gasket to receive the flexcircuit. The relief includes a groove extending across the width of the gasket. The groove has a depth essentially the same as the thickness of the flexcircuit, and a width slight larger than the width of the flexcircuit.

Two ridges are formed across the entire width of the compressible seal portion of the gasket in the area immediately adjacent to the groove. During assembly, the excess compressible material in the ridges of the seal is deformed and displaced to fill the voids between the walls of the groove and the edges of the flexcircuit to ensure a continuity of the seal of the disk storage device enclosure.

7 Claims, 4 Drawing Sheets

GASKET FOR SEALING A FLAT CABLE

FIELD OF THE INVENTION

This invention relates to a gasket for sealing a flat cable, and more particularly to a gasket which provides an environmental seal for a flat flexible wiring cable coupled to components of a disk storage device.

BACKGROUND OF THE INVENTION

In a modern disk storage device operating at a high storage density and close tolerances it is a particular problem to control the environment within that portion of the disk storage device which contains the recording disks and the read/write heads. To ensure proper operation and high reliability of the disk storage device, the humidity within the enclosure containing the disks and read/write heads must be tightly regulated, and solid and gaseous contaminants must be excluded. An enclosure for a disk storage drive enclosure is typically formed as a clam shell configuration including a bottom cast metal mounting base and a top cover.

In a disk storage device, a cable is generally used to electrically couple the internal components, such as the read/write heads, with external components, such as a controller. A typical cable that is suitable for such purposes is formed as a flat ribbon-like flexible multi-conductor cable having a lateral extent substantially greater than its thickness. Such a cable is sometimes known as a flexible circuit or "flexcircuit." In a disk storage device of the type constructed in a clam shell configuration, the area that is most prone to leakage of water vapor, solid contaminants, and corrosive gases is in the vicinity where the cable or flexcircuit is fed between the base and cover of the enclosure.

Various feedthrough techniques are known for routing a cable having a substantially circular profile through an opening in a wall of a sealed enclosure. However, these techniques are generally not readily adaptable to a flat cable such as a flexcircuit. Known techniques which are specifically tailored for flat cables generally involve multiple parts and may require tedious manual assembly to achieve a good seal about the flexcircuit.

One technique for achieving a sealed feedthrough for a flat cable utilizes a molded header consisting of several parts. Typically, the wires are individually separated out of the flexcircuit and positioned at predetermined positions within the header. Then the various parts of the header are clamped together around the wires to maintain an environmental seal. The header is then placed inside the opening of the enclosure with appropriate grommets or gaskets to provide the seal between the header and the enclosure. Alternatively the header is formed with embedded conductive lugs, and the wires of the cable are individually soldered to lugs on opposing sides of the header. Another technique uses injection molding to form a cylindrically shaped plug around the flat cable. The plug and embedded cable are then inserted into a round opening in the the enclosure. O-rings may also be placed in grooves formed around the periphery of the plug to improve the seal between the plug and the walls of the opening in the enclosure.

Other methods of sealing an enclosure of a disk storage device may make use of gaskets. Typically, the gasket is placed between the base and cover portions of the enclosure, the flexcircuit is placed across the seal, and held in place by compressing the base and cover against the gasket. Such a gasket is typically constructed as a specially molded silicone O-ring, a die cut foam seal, a molded rubber seal, adhesive tape, or combinations thereof. Seals of this type require cleaning before they can be applied, and also require a substantial amount of manual dexterity to assemble. However, if assembled incorrectly, seals of the gasket types are prone to leak. Even when assembled correctly, such seals may still leak since the seal relies on compressing the seal material over the flexcircuit. Invariably, after assembly, at either side of the flexcircuit there is a small gap that is not filled completely by the sealing material no matter how hard it is compressed. These gaps are potential leak areas for water vapor, corrosive gases and solid contaminants. Some techniques attempt to correct this deficiency by placing additional pieces of sealing material under or around the flexcircuit, however a good fit at the edges of the flexcircuit is difficult to achieve.

Accordingly, the known techniques for sealing a disk storage device increase labor, rework, and cost, and moreover, do not always guarantee an impervious seal.

Therefore, it is desirable to provide an apparatus for sealing about a flexcircuit of a disk storage device which is simple to manufacture and easy to install.

SUMMARY OF THE INVENTION

In accordance with the invention, there is provided a gasket for environmentally sealing an enclosure of a disk storage device in order to minimize damage to disks and read/write heads mounted therein. The gasket, as disclosed herein, is easy to manufacture, convenient to install, and substantially excludes water vapor, corrosive gases, and solids contaminants from the environment within the sealed enclosure. In addition, the gasket is designed to accommodate a flat flexible wiring cable (flexcircuit) coupling the internal components of the storage device with external control circuits without jeopardizing the continuity of the impervious seal.

The gasket is constructed by attaching a compressible silicone-rubber seal to the inner edge of a rigid plastic frame. The gasket is dimensioned to conform to the mating edges of the base and cover portions of the enclosure. The thickness of the compressible seal is slightly greater than the thickness of the rigid frame. The width of the seal is made smaller than the width of the frame.

A relief is formed on one surface of the gasket to receive the flexcircuit. The relief includes a groove extending across the width of the gasket. The groove is dimensioned to have a depth essentially the same as the thickness of the flexcircuit, and a width slight larger than the width of the flexcircuit. That is, when the flexcircuit is disposed in the groove there is a small rectangularly shaped void between the edges of the flexcircuit and the side walls of the groove.

Two ridges are formed across the entire width of the surface of the compressible seal portion of the gasket, one each in the area immediately adjacent to the side walls of the groove. The cross-sectional area of each ridge is slightly larger than the cross-sectional area of the void between the flexcircuit and the side wall of the groove. During assembly of the disk storage device, the gasket is placed between the base and the cover. Screws are used to draw the base and the cover together, compressing the seal to provide a hermetically isolated environment. As the screws are further tightened the excess compressible material in the ridges of the seal is deformed and displaced to fill the voids, thus providing a snug fit about the flexcircuit, thus minimizing the leakage of contaminants into the enclosure.

These and other features and advantages of the present invention will become apparent from a reading of the detailed description in conjunction with the attached drawings in which like reference numerals refer to like elements in the several views.

DETAILED DESCRIPTION OF THE PREFERRED EMBODIMENT

Figure 1:
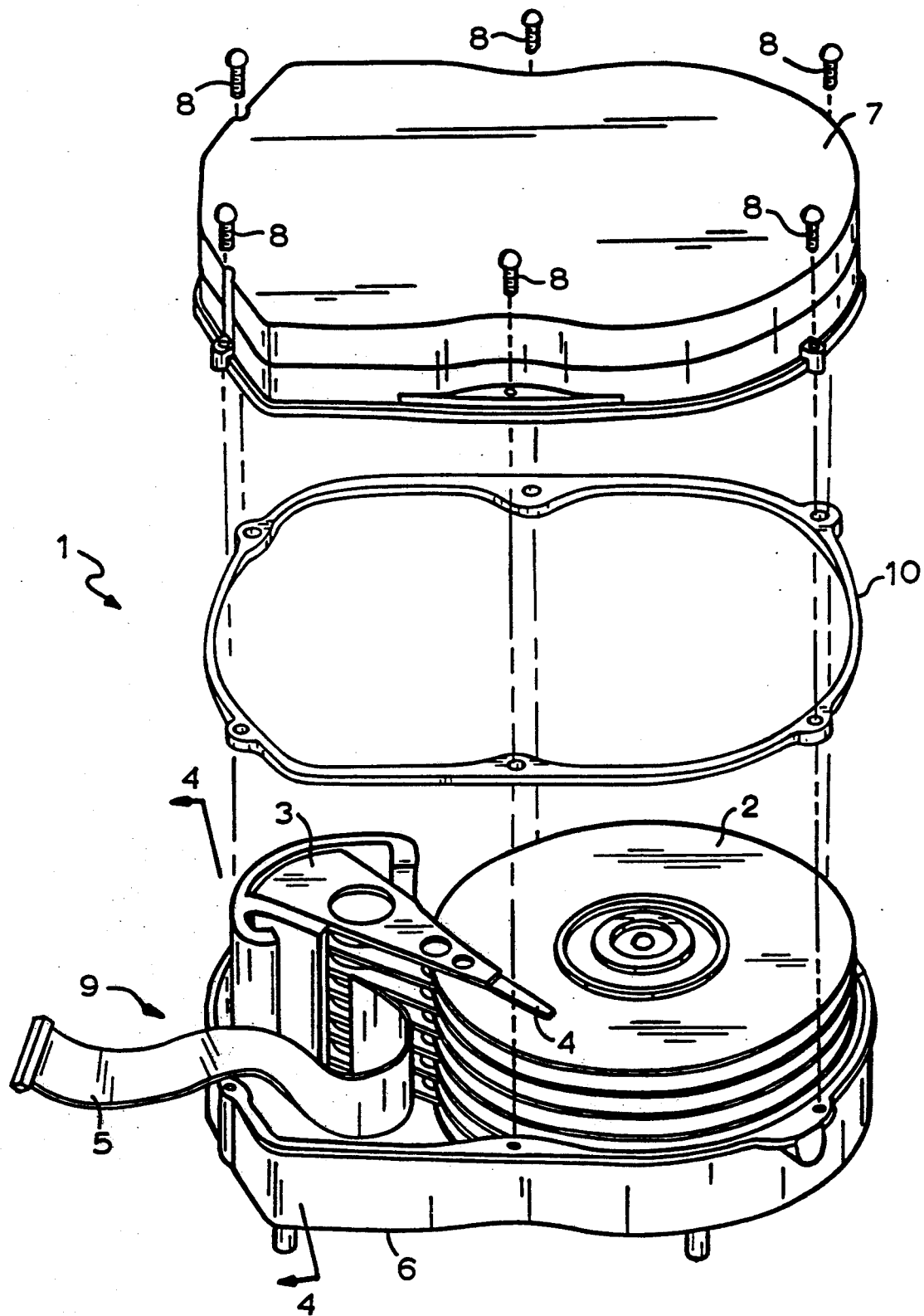
FIG. 1 is exploded view of a disk storage device showing a gasket and flat cable.

In FIG. 1 there is shown an exploded view of a modern high capacity disk storage device 1. The disk storage device 1 includes a plurality of rotatably mounted disks 2 coated with a magnetically or optically sensitive material for storing information. The disk storage device 1 also includes a plurality of radially mounted arms 3 having read/write heads 4 mounted thereon for recording and reading the information on the disks 2.

Each of the read/write heads 4, typically one for each of the surfaces of the disks 2, is selectively coupled to a controller, not shown, by a flat flexible circuit cable 5 having multiple electrically conductive wires therein, not shown. Such a cable, sometimes known as a flexible circuit, or "flexcircuit" generally has a lateral extent or width substantially greater than its thickness. By way of example, a flexcircuit may have a width of approximately 1 inch, and a thickness of less than 0.010 inches (10 mils).

The disks 2 and radial arms 4 are typically mounted on a cast metal base 6. A cover 7 is secured to the base 6 by screws 8 for providing an enclosed environment. A gasket 10 is generally placed between the base 6 and the cover 7 for hermetically sealing the enclosed environment, excluding dust and gaseous contaminants which may interfere with the reliable operation of the disks 2 and read/write heads 4.

Figure 2:
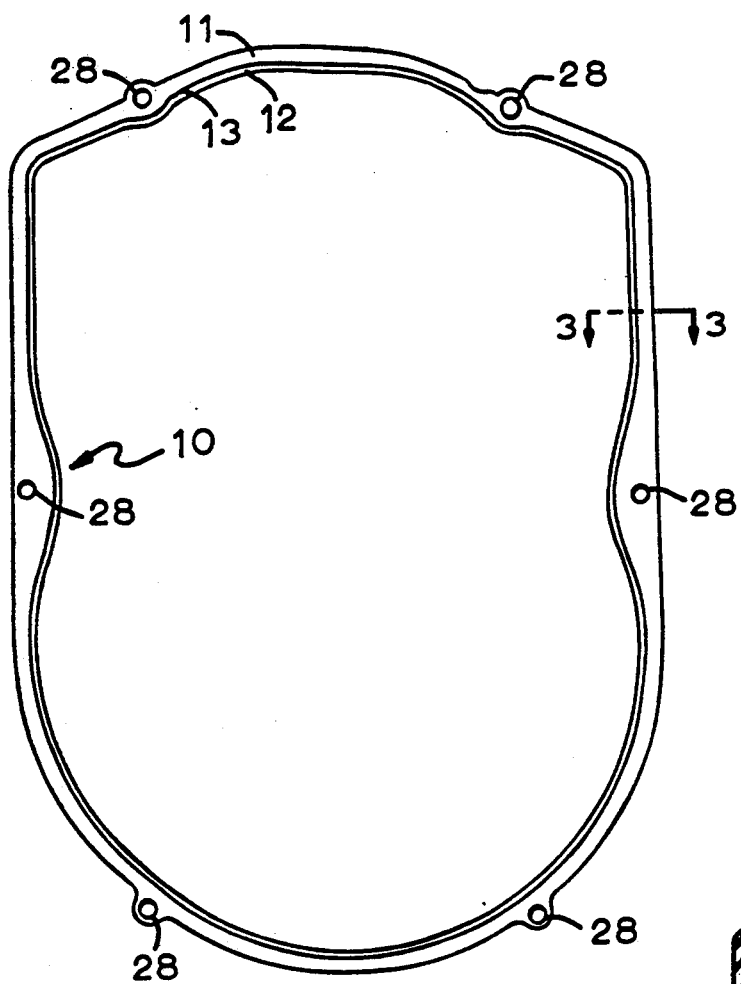
FIG. 2 is a top plan view of the gasket of FIG. 1.
Figure 3:
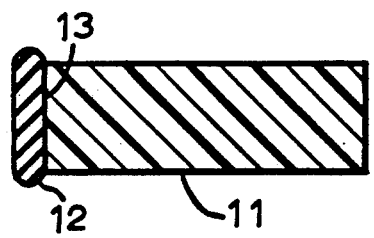
FIG. 3 is a cross-sectional view of the gasket at section 3—3 of FIG. 2.

Now with reference to FIGS. 2 and 3, the structure of the gasket 10 is described in further detail. The gasket 10 includes a rigid frame 11 having a compressible seal 12 attached to the inner edge 13 thereof. The gasket 10 is generally shaped to conform to the mating edges of the base 6 and the cover 7 of FIG. 1. The frame 11 is provided with screw holes 28 dimensioned and arranged to receive screws 8 when the gasket 10 is assembled in place between the base 6 and the cover 7 of FIG. 1. The frame 11 is molded from a reinforced plastic, by way of example 30% glass filled polyphynelleneoxide. Alternatively, the frame 11 can also be constructed from stamped aluminum or other similar light weight rigid materials.

As shown in the cross-sectional view of FIG. 3, the thickness of the compressible portion of the gasket, that is the seal 12 is slightly greater than the thickness of the frame 11. Also the width of the seal 12 is relatively small with respect to the width of the frame 11. The seal 12 is manufactured of a compressible, impervious material, by way of example, a two part silicone rubber, fully cured. The seal 12 is bonded to the inner edge 13 of the frame 11, as shown in FIG. 2, during the vulcanization of the rubber while in the mold.

During the assembly of the disk storage device 1 of FIG. 1, after the disks 2 and radial arms 3 have been mounted on the base 6, the flexcircuit 5 is placed across the top edge of the base 6 in the exit area, generally indicated by reference numeral 9. The gasket 10 is positioned between the base 6 and the cover 7 and across the top portion of the flexcircuit 5. The screws 8, inserted through screw holes 28 of the gasket 10, are used to draw the base 6 and cover together compressing the seal 12 portion of the gasket 10 to provide a hermetic seal between the base 6 and the cover 7.

Typically, the disk storage device 1 is assembled in a room having a relatively clean ambient environment, for example, a Class 100 "clean room" as set out in U.S. Federal Standards and Specifiction 209-D. Consequently, as long as the seal is maintained, corrosive gases, water vapor, and solid contaminants will be excluded from within the enclosure formed by the base 6 and the cover 7.

Figure 4:
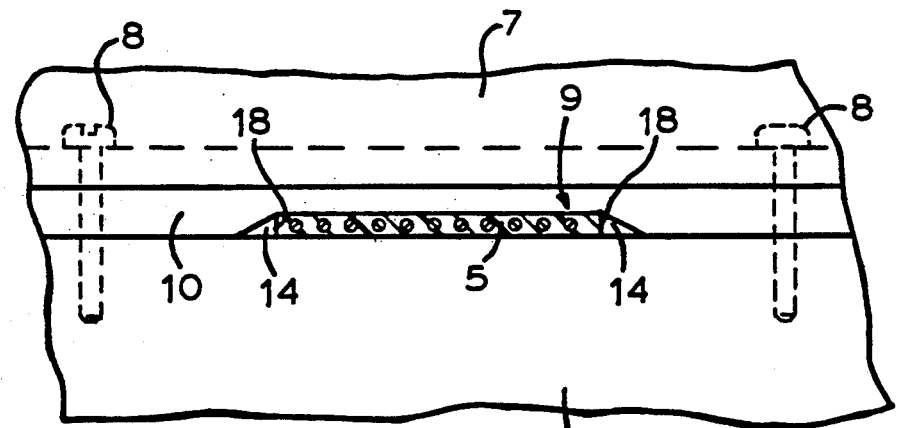
FIG. 4 is a cross-sectional view, at section 4—4 of FIG. 1, of the exit area of the disk storage device.

A particular difficult sealing problem is in the region of the flexcircuit 5 exit area 9. Typically, the known sealing methods rely on the compression of the seal 12 over the flexcircuit 5 as shown in FIG. 4. However, no matter how hard the seal 12 is compressed in cannot fill the generally triangular shaped voids 14 created between the edges 18 of the flexcircuit 5. These voids 14 are known areas of leakage admitting vapor and other gaseous contaminants.

Figure 5:
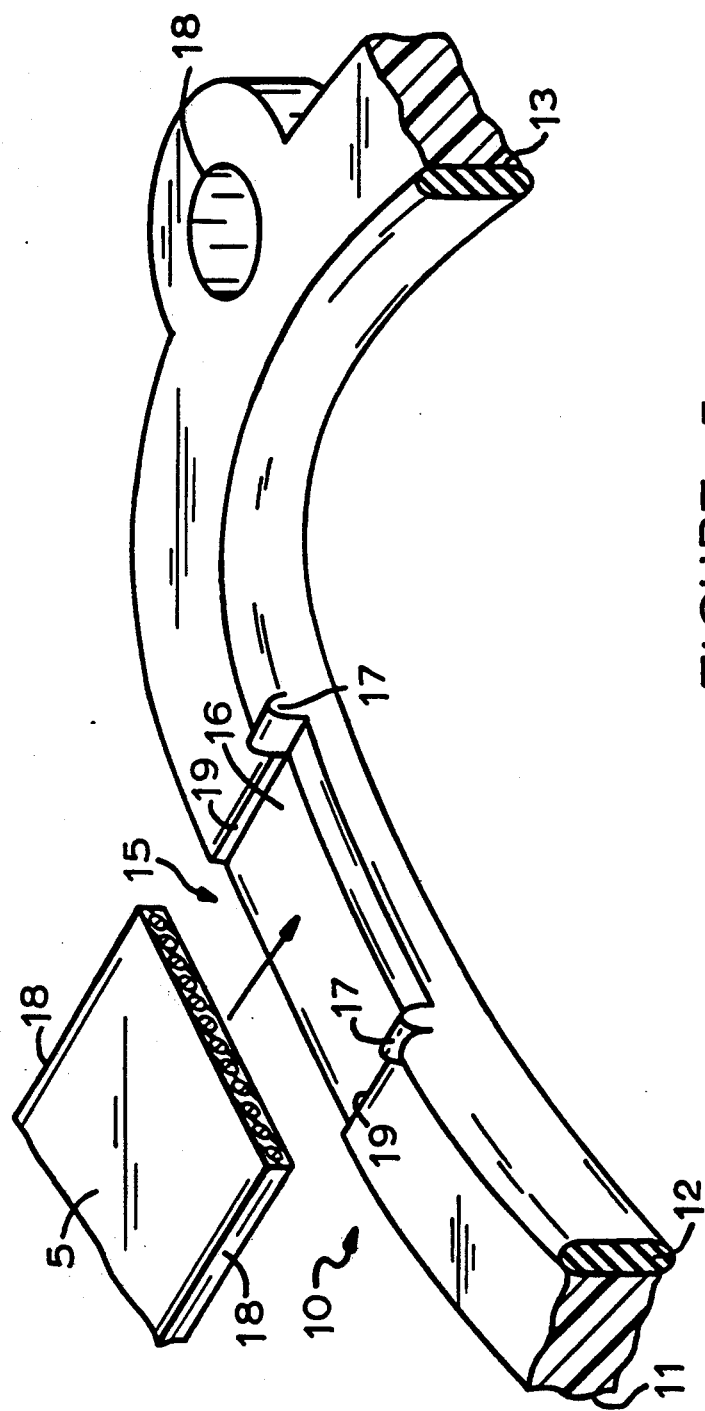
FIG. 5 is a partial enlarged view of the gasket showing the relief according to the invention.

Therefore, according to the present invention, and as shown in FIG. 5, a uniquely shaped relief 15 is formed on one surface of the gasket 10 to reduce the leakage in the region of the exit area 9, particularly through the voids 14 of FIG. 4. The relief 15 comprises a groove 16 extending across the entire width of the gasket 10. The groove is dimensioned to have a depth essentially the same as the thickness of the flexcircuit 5. That is, the side walls 19 of the groove 16 have a height approximately equal to the thickness of the edges 18 of the flexcircuit 5.

The lateral extent of the groove 16 is made to be slightly wider than the width of the flexcircuit 5. That is, when the flexcircuit is placed in the groove 16, small rectangularly shaped voids exist between the edges 18 of the flexcircuit 5 and the side walls 19 of the groove 16.

In addition, the relief 15 also includes two minute ridges 17, one each formed on that surface portion of the compressible seal 12 immediately adjacent to the side walls 19 of the groove 16. Each ridge 17 has a generally semicircular profile extending along the top edge of side wall 19 of the groove 16 for the entire width of the seal 12. The cross-sectional area of the ridge 17 is dimensioned to be slightly larger than the cross-sectional area of the void between the edges 18 of the flexcircuit 5 and the walls 19 of the groove 16 when the flexcircuit 5 is disposed in the groove 16. By way of example, the radius of the semicircular ridge 17 is approximately 0.020 inches (20 mils), giving an area of approximately 0.0006 square inches.

Figure 6:
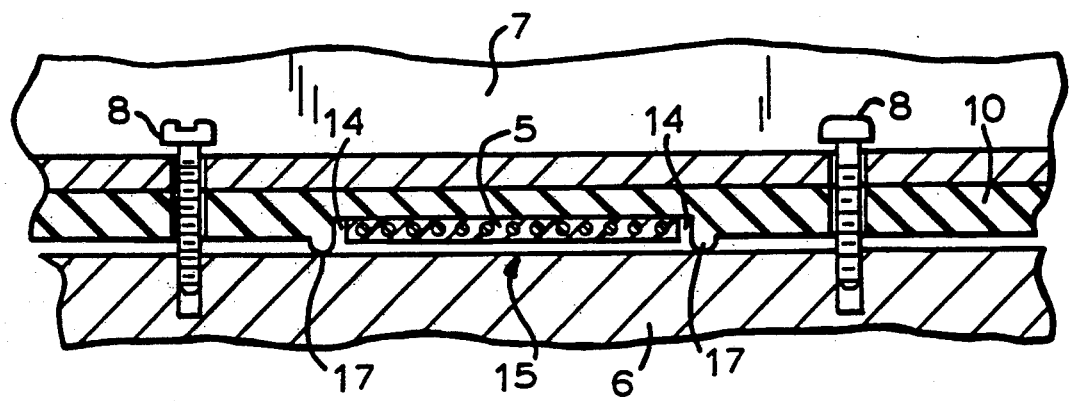
FIG. 6 is a cross-sectional view of the exit area from line 4—4 of FIG. 1 according to the present invention prior to closure.
Figure 7:
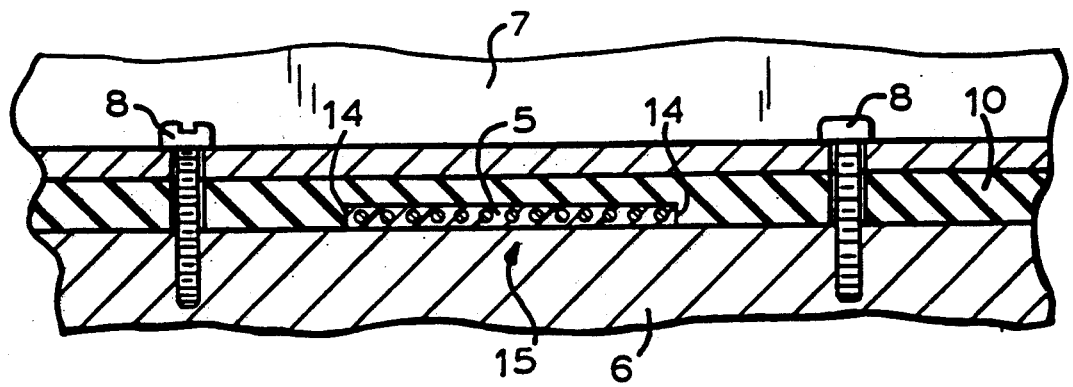
FIG. 7 is a cross-sectional view of the exit area from line 4—4 of FIG. 1 after closure.

The operation of the gasket 10 will now be described with reference to FIGS. 6 and 7. After the flexcircuit 5 has been placed in the region of the exit area 9, the seal 10 is placed on top of base plate 6 and the flex circuit 5 such that the flexcircuit 5 is aligned and positioned within the groove 16 of the gasket 10. The cover 7 is placed on the gasket 10 and the screws 8 are used to draw the base 6 and the cover 7 together. Since the width of the groove 16 is slightly larger than the width of the flexcircuit 5 small rectangularly shaped voids 14 are present between the edges 18 of the flexcircuit 5 and the side walls 19 of the groove 16.

As the screws 8 are further tightened, to draw the base 6 and the cover 7 against the surfaces of gasket 10, the excess material of the ridges 17 is compressed and deformed to fill the area of the voids 14, thus providing a snug fit with the edges 18 of the flexcircuit 5.

The improved gasket 10 with the relief 15 significantly improves the impermeability of the joint between the base 6 and the cover 7 of the disk storage device 1. The gasket 10, according to the present invention, is capable of sealing the enclosure of a helium charged disk storage device 1 to five inches of water above ambient atmospheric pressure. Prior used techniques leaked at only two inches of water pressure. In addition, the gasket 10 as disclosed herein, consisting of a rigid frame 11 and compressible attached seal 12 having a specially adapted relief 15 is simple to manufacture, easy to handle and install, and results in decreased manufacturing and labor costs.

Although the above description has proceeded with reference to a gasket 10 for a disk storage device 1, it is to be understood that the gasket 10 with the relief 15 as is disclosed herein may be adapted to seal a feedthrough aperture for flat flexible cables used with a variety of enclosures requiring a hermetic seal.

While there has been shown and described a preferred embodiment, it is to be understood that various other adaptations and modifications may be made within the spirit and scope of the invention.

What is claimed is:

1. A compressible gasket adapted to be used with a flat wiring cable, wherein the width of a flat surface of said cable is substantially greater than the thickness of said cable comprising:
   a relief formed on one surface of said gasket for receiving said cable, said relief including a groove and a first ridge at a first end of said groove, and a second ridge formed at a second end of said groove;
   said groove having a depth essentially the same as said thickness of said cable, a width slightly larger than said width of said cable to form a void between an edge of said cable and said end of said groove; and
   said first and said second ridge each having a cross-sectional area sufficient to fill said void formed between said end of said groove and said edge of said cable.

2. A gasket as in claim 1, wherein said gasket further comprises:
   a rigid frame;
   a compressible seal attached to the inner edges of said rigid frame, the thickness of said compressible seal being larger than the thickness of said rigid frame; and
   said two ridges are formed only on said seal.

3. A gasket as in claim 2, wherein said frame is a plastic material.

4. A gasket as in claim 2, wherein said seal is a silicone rubber material.

5. A gasket as in claim 1, wherein said first and said second ridges have a semicircular cross-sectional profile.

6. Apparatus for sealing about a flat wiring cable, wherein the width of a flat surface of said cable is substantially greater than the thickness of said cable comprising:
   relief means formed on one surface of said apparatus for receiving said cable, said relief means including a groove and a first ridge at a first end of said groove, and a second ridge formed at a second end of said groove;
   said groove having a depth essentially the same as said thickness of said cable, a width slightly larger than said width of said cable to form a void between an edge of said cable and said end of said groove; and
   said first and said second ridge each having a cross-sectional area sufficient to fill said void formed between said end of said groove and said edge of said cable; and
   means for compressing said first and second ridge to fill said void formed between said end of said groove and said edge of said cable.

7. A method for sealing about a flat wiring cable, wherein the width of a flat surface of said cable is substantially greater than the thickness of said cable comprising:
   placing said cable in a relief formed on one surface of a gasket, said relief including a groove and a first ridge at a first end of said groove, and a second ridge formed at a second end of said groove, said groove having a depth essentially the same as said thickness of said cable, a width slightly larger than said width of said cable to form a void between an edge of said cable and said end of said groove, said first and said second ridge each having a cross-sectional area sufficient to fill said void formed between said end of said groove and said edge of said cable; and
   compressing said first and second ridge to fill said void formed between said end of said groove and said edge of said cable.

* * * * *